Jan. 23, 1968        G. F. MELLEN        3,364,784
BRAKE LEVER MECHANISM
Filed Dec. 17, 1965        2 Sheets-Sheet 1
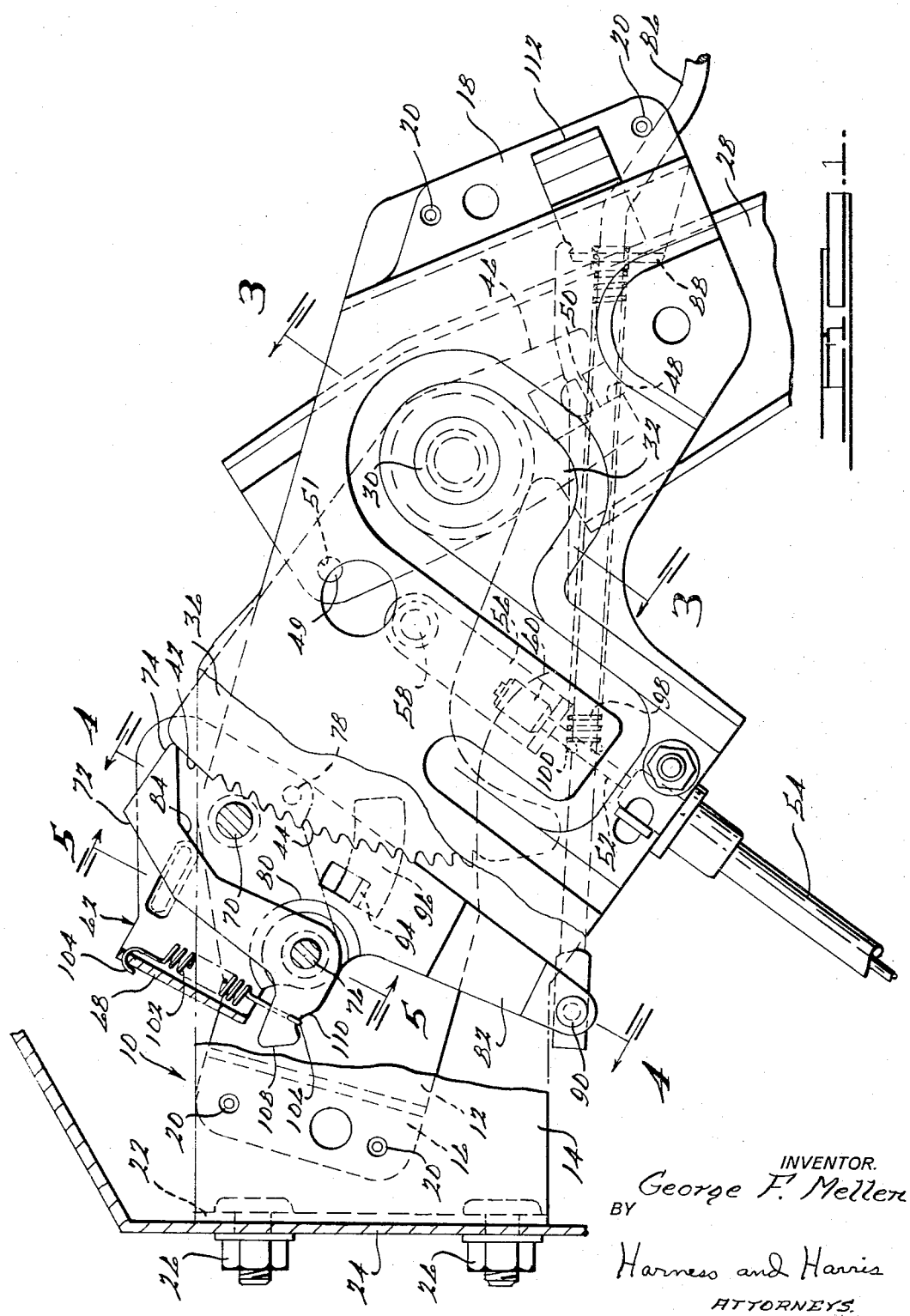
INVENTOR.
George F. Mellen
BY
Harness and Harris
ATTORNEYS.

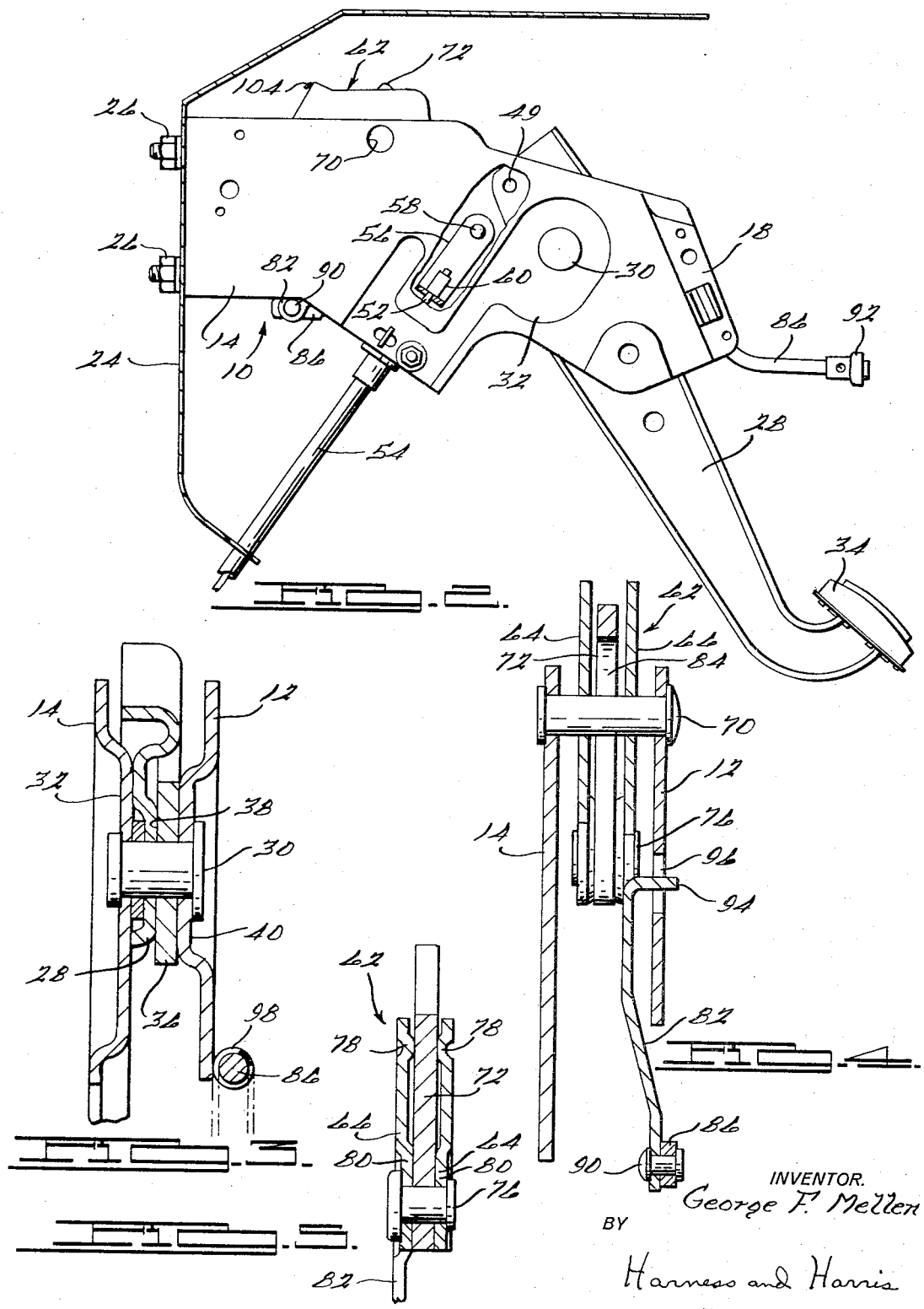

United States Patent Office 3,364,784
Patented Jan. 23, 1968

3,364,784
BRAKE LEVER MECHANISM
George F. Mellen, Pontiac Township, Mich., assignor to Chrysler Corporation, Highland Park, Mich., a corporation of Delaware
Filed Dec. 17, 1965, Ser. No. 514,584
10 Claims. (Cl. 74—540)

This invention relates to control devices and especially to means for controlling the parking or emergency brake mechanism of a vehicle. More particularly, this invention is directed to a brake lever mechanism which has a stationary support or bracket structure, a lever mounted on the bracket structure for pivotal movement relative thereto between brake setting and release positions, and holding means for releasably retaining the lever in its operating position.

Emergency brake control mechanisms commonly employ a manually actuated lever connected with ratchet and pawl members whereby actuation of the lever will partially or fully apply the brake and hold it in applied or actuated condition. A second manually operated lever is generally employed to disengage the ratchet and pawl and thus release the emergency brake. Such arrangements for releasing the emergency brake have not been entirely satisfactory since they frequently require the exertion of considerable force to fully actuate the release lever and disengage the brake. Experience has shown that women, for example, frequently experience difficulty in applying such force to the brake releasing lever.

Accordingly, it is an object of this invention to provide a mechanism which will be effective to securely apply one or more brakes and which will none the less be easily released through application of minimum force in the movement of a release control member.

Another object of the present invention is to provide a novel brake applying mechanism of the pawl and ratchet type in which the pawl is movably mounted on a member which itself can be moved so that it carries the pawl to a position where it is easily rocked out of engagement with the ratchet.

A further object is to provide a novel brake applying mechanism of the pawl and ratchet type in which the pawl is mounted on a member which maintains both the ratchet and pawl in engageable alignment.

Another purpose is to provide a mechanism which is strong, durable, easy to manufacture and requires a minimum of component parts.

According to the present invention, a mechanism for controlling the brakes of a vehicle is provided which includes in combination, a bracket member having a lever movably connected thereto, retaining means for locking the lever in various positions, and releasing means for disengaging the retaining means. The lever, which can be either hand or foot operated, is operable to tension a brake setting cable and thereby set the brakes of a vehicle. To hold the brakes in set position, a retaining device of the pawl and ratchet type is provided which, upon movement of the lever in a brake applying direction, lock together so as to prevent the lever from returning to a brake released position and relaxing the brake setting cable. The tension on the brake setting cable upon actuation of the brake lever is considerable and, hence, the ratchet and pawl are wedged together so that considerable force would normally have to be applied to the releasing means in order to cause their disengagement. Accordingly, the mechanism of this invention incorporates a unique arrangement wherein the pawl is movably supported on a pawl support and the releasing means is operatively connected to the pawl support rather than the pawl itself. Operation of the releasing means causes the pawl support to move and carry the pawl to a first position where the pawl engages a surface which serves as a fulcrum. Further movement of the pawl support results in the pawl being rotated about the fulcrum and levered out of engagement with the ratchet. Thus, this invention provides for ease of release of the retaining device by an arrangement whereby the pawl can be moved, while the pawl is in locking engagement with the ratchet, to a position where a portion of the pawl becomes a lever arm.

The above and other objects, features and advantages of the invention will be apparent from the following detailed description of a preferred embodiment of the invention and from the accompanying drawings wherein:

FIGURE 1 is a detailed side elevational view of a parking brake actuating device constructed in accordance with the present invention with parts thereof broken away for purposes of clarity;

FIGURE 2 is a side elevational view, with a portion thereof broken away, of the parking brake mechanism of FIGURE 1 omitting internal details for purpose of clarity and including the foot-operated actuating lever and hand operated release linkage;

FIGURE 3 is a cross-sectional view taken generally on the line 3—3 of FIGURE 1;

FIGURE 4 is a cross-sectional view taken generally on the line 4—4 of FIGURE 1; and FIGURE 5 is a cross-sectional view taken generally on the line 5—5 of FIGURE 1.

This invention is illustrated and described, by way of example and not by way of limitation, in conjunction with the control of a vehicle parking or emergency brake, and when thus utilized is disposed in the driver-occupied compartment and is preferably mounted on the firewall which separates such compartment and the engine compartment. The brake lever structure of this invention has a bracket member 10 which is comprised of two plates 12 and 14 which for a substantial portion of their length are generally parallel to and spaced from each other. One end of plate 12 is bent near the forward end of the bracket so as to have a portion 16 which abuts plate 14 while the opposite end of plate 14 is bent so as to abut plate 12 at 18. The abutting wall portions are secured together as by rivets or welds 20. Plate 14 is provided at its forward end with a flange portion 22 by which the bracket member 10 is secured to the firewall 24 by fasteners 26.

A brake applying pedal or lever 28 is positioned between the spaced portions of plates 12 and 14 and is mounted by a pin 30, extending between and carried by the plates 12, 14, such that the pedal swings or pivots between neutral and brake actuating positions. A portion 32 of plate 14 is inwardly pressed so as to supportingly engage a side portion of pedal 28 in the area of pin 30. The lower end of pedal 28 (FIGURE 2) is provided with a foot pad 34 which, when depressed by the car operator, will cause pedal 28 to swing in a clockwise direction.

A ratchet or sector 36 (FIGURE 1) is carried by pedal 28 and is pivotally mounted on pin 30. To provide lateral support, the ratchet 36 has a portion 38 (FIGURE 3) of one of its sides in contact with a side of pedal 28 and a portion of its opposite side in engagement with a boss 40 formed in plate 12 in the area of the pin 30. An arcuate surface 42 of a portion of the ratchet 36 which extends generally above the pin 30 is provided with a plurality of teeth 44. A portion 46 of the ratchet which extends below the pin 30 has a notch 48 and is securely coupled to the pedal 28 by means of a projection 50 extending from the pedal which engages the sides of notch 48. In addition, a portion of the ratchet 36 which extends above the pin 30 is provided with a stud 49 which is received in an aperture 51, formed in the pedal 28. Accordingly, pivotal movement of the pedal 28 will cause pivotal movement of ratchet 36 in the same direction.

A pull-type brake applying cable 52 provided with the usual sheath 54 has an end portion (not shown) connected to the wheel brake mechanisms. The opposite end of the cable extends through the end wall of a clevis 56 which straddles the ratchet 36 and is connected thereto by a pin 58. The cable 52 has a head portion 60 which is disposed between the clevis side walls and abuts the clevis end wall thereby connecting the cable and clevis. Thus, clockwise movement of the ratchet 36 due to the operator pressing the pedal 28 causes the brake cable to be pulled rearwardly thereby actuating the wheel brake mechanism.

A pawl support 62 of U-shaped cross-sectional configuration is carried on a forward portion of the bracket member 10 and is positioned between the plates 12 and 14 thereof. The pawl support has two generally parallel spaced sides 64, 66 which are interconnected by a web portion 68. As seen with particular reference to FIGURE 4, the pawl support is pivotally connected at an upper portion thereof to the bracket member 10 by means of a rivet 70 which extends through the bracket side walls 12, 14 and the pawl support sides 64 and 66.

Pivotally connected to the pawl support 62 is a pawl 72 provided on an upper portion thereof with a tooth portion 74. As seen with particular reference to FIGURES 4 and 5, the pawl 72 is positioned between the spaced side walls 64, 66 of pawl support 62 and is pivotally mounted thereon on a pivot axis spaced from the tooth portion 74 by means of a rivet 76 which extends through the side walls 64, 66.

The ratchet 36 and pawl support 62 are positioned such that the pawl support straddles at least the portion of the ratchet which is provided with the teeth 44 thereby maintaining proper alignment for engagement of the pawl tooth 74 with the ratchet teeth 44. Thus, each of the pawl support side walls 64, 66 is provided with an inwardly extending projection 78 (FIGURE 5) which is engageable with a side of the ratchet. Likewise, the sides of pawl 72 are in contact with a recess or boss 80 formed in each of the pawl support walls 64, 66. Accordingly, the pawl tooth 74 rides on the arcuate surface 42 of the ratchet 36 and engages teeth 44 when the ratchet 36 is pivoted clockwise due to actuation of the pedal 28. The configurations of tooth 74 and teeth 44 are such that the lines of action of these teeth when engaged will be so located as to prevent counterclockwise movement of ratchet 36.

A brake releasing means for disengaging the ratchet-pawl retaining means is provided which includes an arm 82 extending from the pawl support 62. As seen with respect to FIGURES 1 and 4, arm 82 can be an integral part of the pawl support side 66. Movement of the arm 82 in a rearward or counterclockwise direction causes simultaneous counterclockwise movement of both the pawl support 62 and the pawl 72. With reference to FIGURE 1, it is seen that such movement carries the pawl 72 and its pivot axis 76 downwardly and rearwardly to a position where an underside portion 84 of the pawl contacts the rivet 70 which then serves as a fulcrum with respect to the pawl. Further downward movement of the pawl causes the pawl to rotate about the rivet thereby causing the pawl tooth 74 to be cammingly disengaged from the ratchet teeth 44. It will be apparent that a pin or finger member extending from one or both of the bracket member side walls 12, 14 and positioned so as to be in the general path of travel of the pawl 72 as it is carried by the pawl support 62, could serve as a fulcrum in place of the rivet 70.

For convenience in operating the brake releasing arm 82, a release rod 86 is provided. One end portion of rod 86 is connected to the bracket 10 by means of a collar 88 which is an integral part of the bracket plate 12. The other end of rod 86 is connected to arm 82 by means of a rivet 90. A portion of the rod 86 extends rearwardly of the bracket 10 and is provided with a handle 92 (FIGURE 2) by which the rod may be moved forward or rearward so as to cause the pawl support 62 and pawl 72 to rotate counterclockwise or clockwise, respectively. Rotational movement of the pawl support 62 is limited by a stop means which comprises a finger 94 lanced from the pawl support side wall 66 which projects into an elongated slot 96 formed in bracket plate 12.

For cooperating in maintaining the pawl 72 and the ratchet 36 in brake retaining position, resilient means are provided for biasing the pawl support 62 and pawl 72 to a position where the tooth portion 74 of pawl 72 is in engageable relationship with teeth 44 of ratchet 36. The resilient means comprises a first spring 98 surrounding release rod 86 which is disposed (see FIGURE 1) between projections or ears 100 formed on the rod 86 and the collar portion 88 of bracket 10. Normally, spring 98 urges rod 86 forwardly and thereby maintains pawl support 62 in a position such that the pawl 72 can contact the arcuate surface 42 of ratchet 36. To position the pawl 72 such that its tooth portion 74 is engaged with surface 42 of the ratchet, an additional resilient member is positioned between the pawl and pawl support. This resilient member comprises a second spring 102 having its ends 104, 106 shaped as hooks. One end 104 of the spring 102 is connected to the upper surface of web portion 68 of pawl support 62 and its opposite end 106 is connected to the tail portion 108 of pawl 72 which is provided with a cooperating notch 110.

In operation, with the various components of the mechanism in their respective positions as shown wherein the brake to be actuated is in its released position, the pedal 28 extends rearwardly and abuts a rubber bumper 112 affixed to plate 14, and the tooth portion 74 of the pawl is in contact with the arcuate surface 42 of ratchet 36 due to the biasing action of springs 98 and 102. When force is applied to pedal 28 so as to cause it to rotate clockwise or forwardly about its pivot pin 30, the ratchet 36 is rotated clockwise to a point at which the tension in brake applying cable 52 prohibits further movement. Tooth portion 74 of the pawl 72 is then engaged with teeth 44 of the ratchet 36 and this prevents the ratchet from moving in a brake releasing or counterclockwise direction. Due to the coupling of the ratchet 36 to the brake pedal 28 by means of stud 49 and projection 50, the brake pedal 28 is also held in a forward position. To release the vehicle brakes, the release rod 86 is pulled rearwardly by means of handle 92 so as to overcome the biasing force of spring 98 and the pawl support 62 is rotated counterclockwise. This counterclockwise movement of the pawl support 62 simultaneously carries the pawl 72 downwardly and rearwardly to a point at which the under surface 84 of the pawl 72 contacts the rivet 70 which then serves as a fulcrum about which the pawl rotates to be cammed out of engagement with the ratchet teeth 44. Tension on the brake applying cable then causes the ratchet 36 and pedal 28 to return to the brake released position as illustrated in FIGURE 1.

From the foregoing description it is apparent that the objects of this invention have been obtained, and it will be understood that modifications and variations may be effected without departing from the scope of the novel concept of the present invention as defined by the appended claims.

I claim:

1. Mechanism for controlling the brakes of a vehicle, said mechanism including a bracket member, a brake applying lever member mounted on said bracket member for movement between brake setting and brake release positions, retaining means for holding the brake applying lever member in various brake setting positions, and brake releasing means for disengaging said retaining means, said retaining means comprising a pawl support movably mounted on one of said members, a toothed ratchet carried by said pawl support, and a pawl movably mounted on said pawl support, resilient means normally biasing the pawl support and pawl to a position wherein a tooth portion of the pawl is in contact with the ratchet, and said brake releasing means comprising a fulcrum carried by said bracket member and positioned so as to be in the general path of travel of said movable pawl, and an arm portion on said pawl support which is movable to a brake releasing position, said movement being operative to effect simultaneous movement of the pawl support and pawl to a first position where a portion of the pawl contacts said fulcrum, further movement of said arm portion causing said pawl to be rotated about the fulcrum surface thereby disengaging said pawl tooth portion from said ratchet.

2. The mechanism of claim 1 wherein the fulcrum is the mounting of the pawl support.

3. The mechanism of claim 1 wherein the pawl support is pivotally mounted on the bracket member and the ratchet is carried by the brake applying lever member such that movement of said lever member in a brake applying direction causes movement of the ratchet, said ratchet being operatively connected to the lever member so that the ratchet prevents movement of the lever member in a brake releasing direction when the ratchet is engaged by the pawl.

4. The mechanism of claim 1 wherein said brake releasing means comprises a manually operable rod extending from said pawl support and connected to said bracket member, and wherein said resilient means comprises a spring connected between said bracket member and said rod.

5. The mechanism of claim 1 wherein the pawl support comprises a channel shaped member having two generally parallel spaced side portions interconnected by a web portion, and wherein said arm of said brake releasing means comprises an integrally formed laterally extending portion of one of said pawl support sides.

6. The mechanism of claim 5 wherein said pawl support pivots about a fastener which extends through and substantially normal to each of said pawl support side portions, and wherein said pawl is positioned between said pawl support side portions and is pivoted to said pawl support on a pivot axis spaced from said fastener.

7. The mechanism of claim 1 wherein the pawl support has an upper portion and a lower portion and comprises a channel shaped member having two generally parallel spaced side portions interconnected by a web portion, said pawl support being pivotally mounted at said upper portion on said bracket member by a fastener which extends through and substantially normal to each of said pawl support side portions, and where said pawl is positioned between said pawl support side portions, said pawl having one end thereof provided with a tooth portion and its opposite end region pivotally connected to said lower portion of said pawl support.

8. The apparatus of claim 7 wherein said resilient means includes a spring connected between said pawl support and said pawl and wherein the fulcrum is the fastener pivotally securing the pawl support to the bracket member.

9. The apparatus of claim 7 wherein said ratchet and said pawl support are positioned such that at least a portion of the ratchet is disposed between and in engageable relationship with the spaced side portions of the pawl support.

10. The apparatus of claim 7 wherein said bracket member and said pawl support member are provided with means which cooperate to limit pivotal movement of the pawl support, said means comprising an elongated slot formed in one of said members and a finger extending from the other of said members which projects into said slot.

References Cited
UNITED STATES PATENTS 2,899,838   8/1959   Johnstone _____ 74—540
2,940,334   6/1960   Koskela _____ 74—542 X MILTON KAUFMAN, *Primary Examiner.*